(No Model.)　　　　　　　　　　　　　　　　　　3 Sheets—Sheet 1.
H. BAINES.
VELOCIPEDE.

No. 351,243.　　　　　　　　　　　Patented Oct. 19, 1886.

WITNESSES:　　　　　　　　　　　　　　　INVENTOR
　　　　　　　　　　　　　　　　　　　　　Hugh Baines
　　　　　　　　　　　　　　　　　　BY
　　　　　　　　　　　　　　　　　　　　　ATTORNEYS

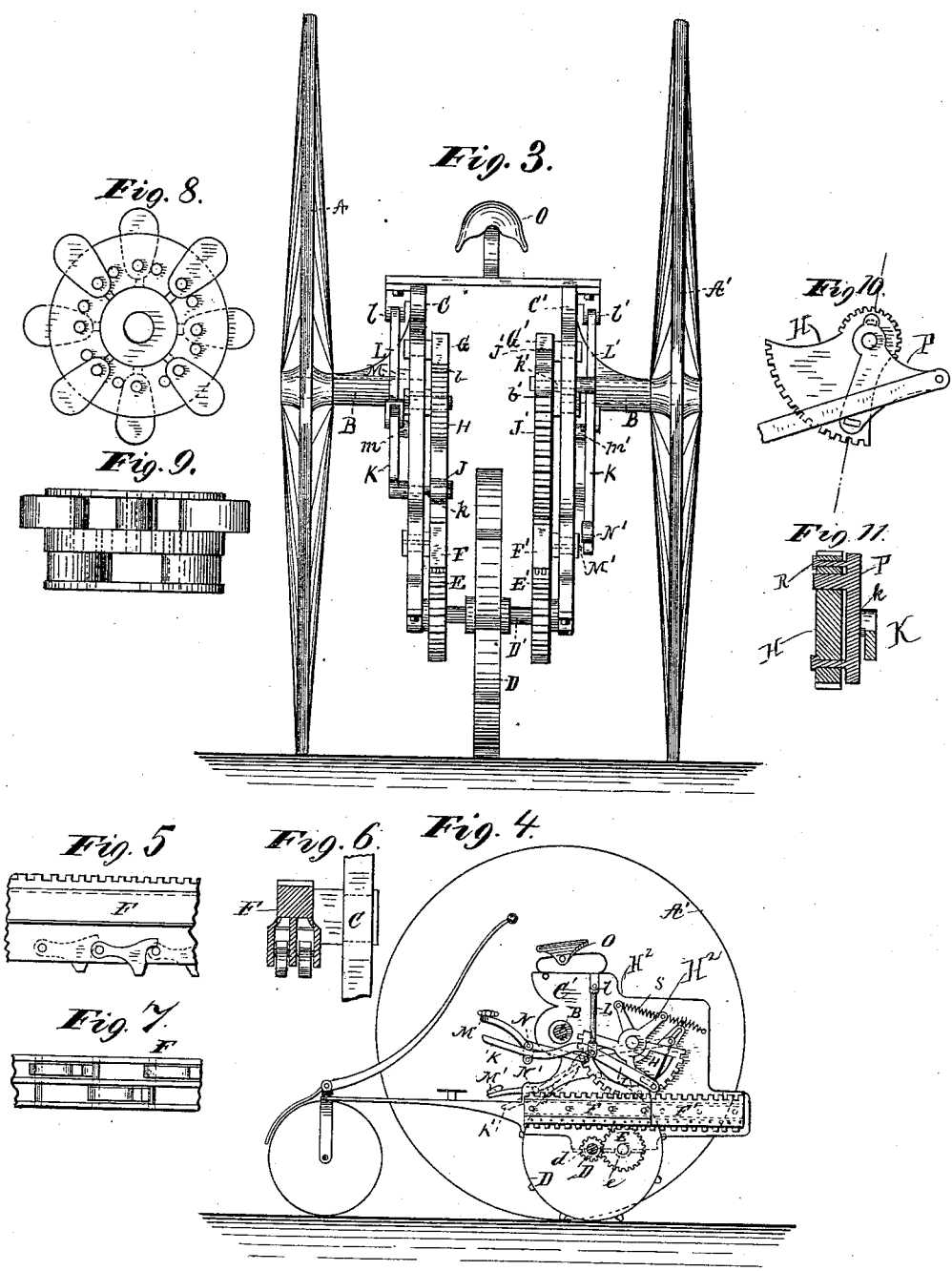

(No Model.)  H. BAINES.  3 Sheets—Sheet 3.
VELOCIPEDE.

No. 351,243.  Patented Oct. 19, 1886.

WITNESSES:
Gabriel J. W. Gabster
F. A. Hopkins

INVENTOR
Hugh Baines
BY
Knight Bro
ATTORNEYS

UNITED STATES PATENT OFFICE.

HUGH BAINES, OF BROOKLYN, NEW YORK.

VELOCIPEDE.

SPECIFICATION forming part of Letters Patent No. 351,243, dated October 19, 1886.

Application filed March 17, 1886. Serial No. 195,586. (No model.)

*To all whom it may concern:*

Be it known that I, HUGH BAINES, of the city of Brooklyn, in the county of Kings and State of New York, a civil engineer, have invented certain new and useful Improvements in Vehicles and Motors, of which the following is a specification.

My invention in the present instance relates to the method of communicating the power applied to the driving wheel or wheels, and in an arrangement which provides for a flexible fulcrum in the frame of the vehicle or motor, so that the power not utilized directly on the driver or drivers will be applied indirectly through the medium of the frame, as will be hereinafter described.

In the preferred form of my invention I provide what I term a "rotary fulcrum" and "driving-wheel," situated in the rear of the main wheels, the said additional wheel being provided with teeth or projections of any kind or shape on its periphery which will enable it to bite into the ground, so as to afford additional traction in starting and when climbing grades; or the wheel may be provided with rubber tire or a plain face, which will serve the same purpose in a less degree. This additional wheel, though desirable, is not absolutely indispensable, as I may apply my invention to a tricycle or a three-wheeled vehicle, and utilize the main wheels as drivers, as will be described.

Figure 1:
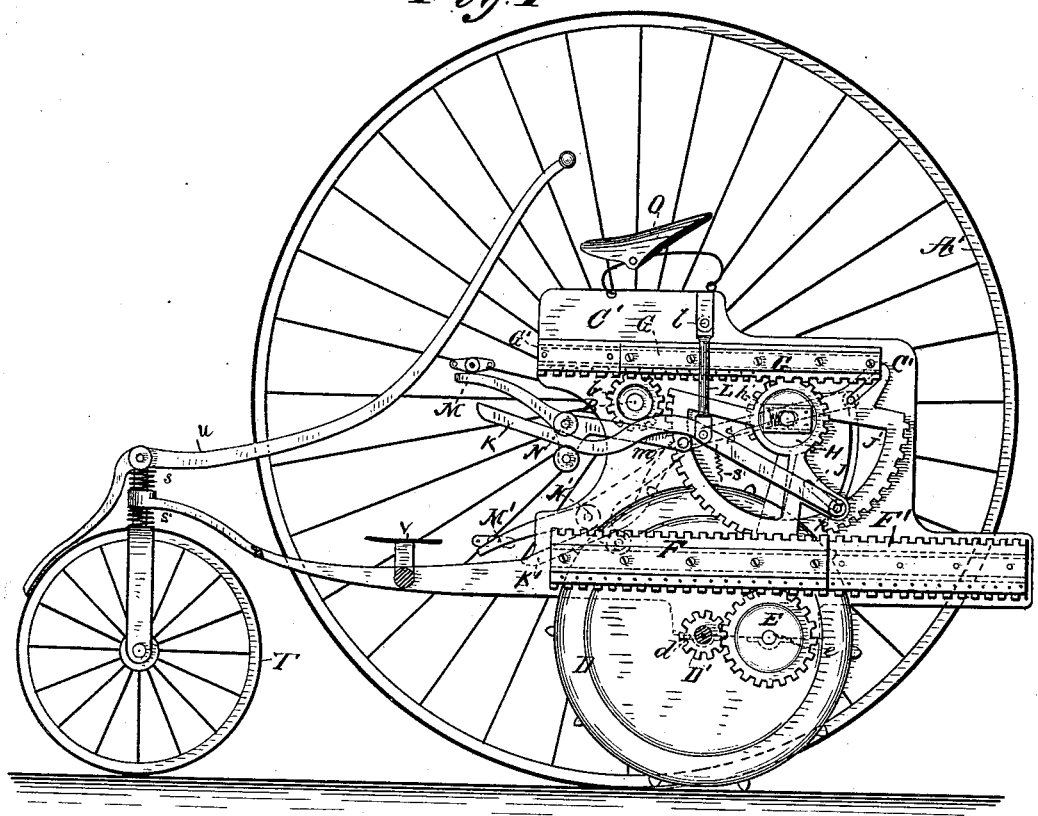
Figure 2:
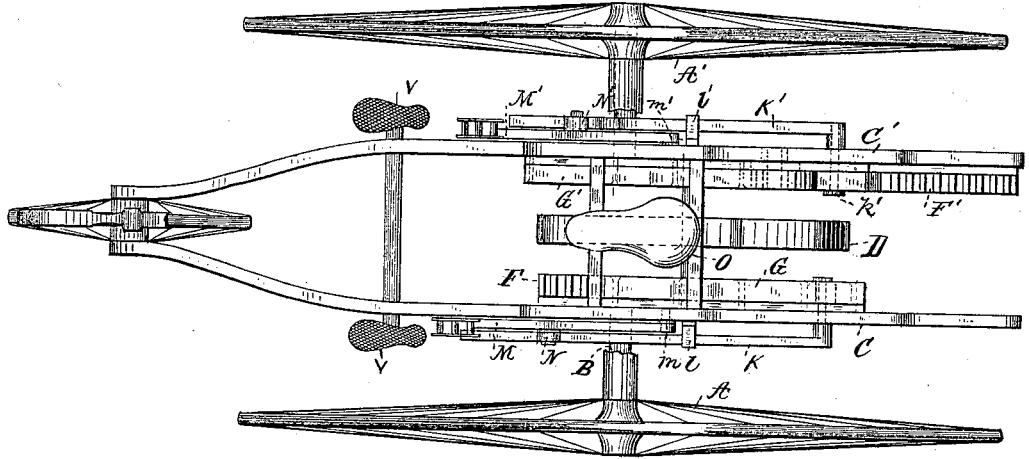
Figure 12:
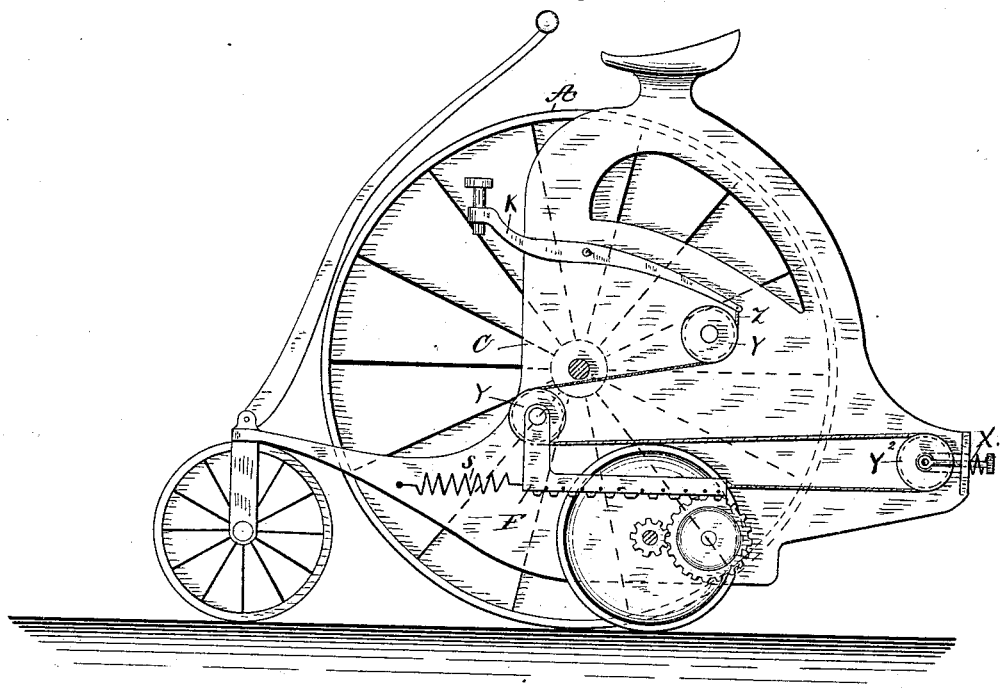
Figure 13:
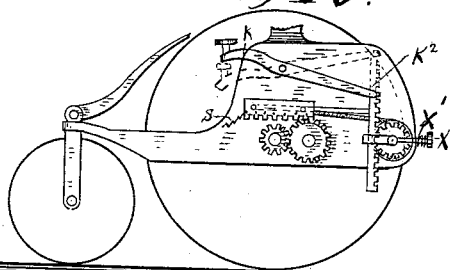

Referring to the accompanying drawings, Figure 1 is a side elevation, partly in section, of one form of my invention. Fig. 2 is a ground plan. Fig. 3 is an end elevation, and Fig. 4 is a modification. Figs. 5 to 11, inclusive, are detail views. Figs. 12 and 13 are other modifications.

In the drawings, A A' represent the main driving-wheels, provided with separate axles B B'. These axles are set into and extend through the main frame C of the vehicle. In this frame is also set the axle D' of the rear or rotary fulcrum-wheel, D. Upon the axles B, B', and D' are keyed, respectively, the pinion-wheels $b$, $b'$, and $d$. These pinion-wheels, when turned, will operate the driving-wheels through the medium of the axles, to which latter the said driving-wheels are rigidly attached. Within the frame C, also, are set the axles $e$ $e'$ of the pinion-wheels E E', which gear with and are adapted to rotate the wheels $d$ $d'$, and consequently the wheel D. The pinion-wheels E E' are operated by means of the horizontally-sliding racks F F'. The latter are provided with movable teeth in their lower portions, as shown in Fig. 1, and the detail, Figs. 5, 6, and 7, and as the racks travel rearward the teeth will fall into place and turn the pinion-wheels E E'. When the racks move forward again on the return-stroke, the movable teeth will fall back and drop out of gear with the teeth on the pinion-wheels. On the direct stroke they will assume their normal operative position again. Racks G G' are also provided in the upper portion of the vehicle for turning the pinion-wheels $b$ $b'$.

This part of my invention is not absolutely essential, as the racks G G' and pinion-wheels $b$ $b'$ are only intended to supplement the lower racks and pinions and render the movement of the vehicle more even and steady. The racks G G' are provided with movable teeth on those portions which gear with the aforesaid pinion-wheels, and are adapted to operate the same as the teeth described in connection with the racks F. In lieu, however, of the racks being provided with the movable teeth, I may place them on the pinion-wheels $b$ $b'$ and $d$ $d'$, as shown in detail in Figs. 8 and 9. In either case the teeth are arranged alternately on both sides of the rack or pinion, so as not to interfere with or overlap each other. The detail views referred to illustrate this construction.

Pivoted to sliding blocks $h$ $h'$, which move in slots within the frame C, are segments H H', the said segments being provided with teeth which gear with and are adapted to operate the horizontally-moving racks F F' and G G'. When the racks G G' and the pinion-wheels $b$ $b'$ are omitted, the upper portion of the segments H H' are made smooth, instead of being supplied with teeth, as shown in the drawings. This form is illustrated in Fig. 4. The segments H H' are provided with rearwardly-extending arms or lugs J J'. To the ends of these lugs are pivoted the transverse arms $k$ $k'$ of the horizontal levers K K'. These levers are pivoted at their central points to the vertically-depending arms L L'. The latter are attached to the main frame at $l$ $l'$. The treadle-levers M M' are pivoted to the frame at $m\ m'$, and are provided with rollers N N', which seat and travel on the outer ends of the levers M M'.

As the drawings show, the tread of the wheel D is slightly in the rear of the tread of the main driving-wheels A A'. A seat, O, is attached to the main frame at the top and between the axles of the main driving-wheels and the rear wheel.

The depending arms L L' are pivoted at points on the main frame slightly in front of an imaginary vertical line drawn through the axle of the rear or fulcrum wheel, D. By this means when the pressure is applied on the treadle-levers M M' K K' the stress is transferred to the plane of the imaginary line above referred to. It will be seen, therefore, by referring to the drawings, that the greatest possible pressure is brought to bear at the tread of the fulcrum-wheel D when any force is applied upon the treadle-levers. The wheel D, being provided with teeth, as shown in Figs. 1 and 4, will take a firm hold upon the ground, and consequently the vehicle will respond to and move forward on the least application of pressure upon the treadle-levers.

The lug or arm J J' of the segment-gearings H H' are provided with slots $j\ j'$, and it is in these slots that the arms $k\ k'$ of the levers K K' find bearings. When stress is applied to one of the operating-levers, the segment to which it is connected will begin to turn on its pivot as the rear end of the lever K is forced upward. The stress so applied on the segment is transferred, by means of the teeth-gearing, to the horizontally-moving rack F, and the arm $k$ will slip in the slot, and the block $h$, which holds the segment, will slide forward slightly, thereby throwing the force directly against the frame C of the vehicle. A spring, S', is interposed between the sliding blocks and the frame, and these sliding blocks $h\ h'$ constitute what I term a "flexible fulcrum" in the frame of the vehicle.

The arrangement shown in Figs. 10 and 11 may be employed, when desired. In this case the transverse arms $k\ k'$ are not attached directly to the segments, but to plates P P', which plates are provided with inwardly-extending pins or projections R R', which seat in slots in the segments.

T is a front guide-wheel, controlled by a hand-lever, U, the handle of which is arranged convenient to the rider. The outer end of this lever is arranged in the form of a brake-shoe, and is adapted to be pressed against the periphery of the wheel T when it is desired to stop or impede the motion of the vehicle. A spring, $s$, keeps the brake normally away from the wheel. When the rider desires to apply the brake, he steps forward on the foot-rests V, which will place considerable weight on the wheel T, affording it sufficient traction to serve the purpose described.

A second small spring, $s'$, is placed under the arm of the main frame, which extends forward over the front wheel, for the purpose of raising that part of the frame and keeping the fulcrum-wheel D on the ground.

The modification shown in Fig. 4 omits the upper racks, and the vehicle is propelled entirely through the medium of the lower racks with the assistance of the arms $H^2$, which are attached to the frame of the vehicle by means of the springs S.

In Fig. 12 I substitute for the segments H H' the cords or chains Z, which are attached to and are adapted to operate the sliding racks F. As in the other figures, the levers K K' are pivoted to the frame of the vehicle. The cord or chain Z moves over the pulley-sheave Y, pivoted in the frame C, then over the sheave Y', journaled in the rack-frame F, then over the sheave $Y^2$, pivoted flexibly to the frame C, and finally is attached to the rear end of the rack F. The sheave $Y^2$ is pivoted to a spindle, X, which extends through the frame, and is provided with a head or button, $x$, at its outer end. Between this head and the rear of the frame is placed a spring, X', which serves to equalize the stress placed on the rear of the frame by virtue of the cord or chain Z moving over the sheave $Y^2$.

In Fig. 13 the rear wheel is dropped and the segment-gearing is connected directly to the axle of the main wheels. A vertical lever, $K^2$, is swiveled to the horizontal lever K, and is provided with segment-gearing, which intermesh with the teeth on the wheel $Y^2$. As the lever $K^2$ moves up the sheave $Y^2$ turns around and the rope or chain Z (being attached to the sheave) operates the rack F. The principles involved are, however, essentially the same as those in the other figures, which is to provide a fulcrum, more or less elastic or flexible, on the frame, and to apply the driving-power to one or more of the driving-wheels, and to balance the stress so applied to the flexible fulcrum on the frame.

For the purpose of withdrawing the racks to their operative or first position without an exertion on the part of the rider, I provide springs S, which, in the device shown in Fig. 1, is attached at one end to the frame and at the other end to the lever K. In Fig. 4 it is attached to the frame and to an arm of the segment H. In Figs. 12 and 13 it is attached to the rack and to the frame. In all of these cases the operation is the same—namely, the withdrawing of the rack to an operative position.

Having thus described my invention, what I claim as new therein, and desire to secure by Letters Patent, is—

1. In a vehicle or motor, the combination of the driving wheel or wheels, the frame supported on the wheels, the operating lever or levers hung in the frame, means of connection between the driver or drivers, and an intermediate fulcrum connected flexibly to the frame, whereby the power may be applied to the driving-wheels and the frame in equal or nearly equal proportions.

2. In combination with a vehicle, a rotary fulcrum and driver-wheel situated in the rear of the main wheels and connected with the operating mechanism of the vehicle, whereby it can be rotated in unison with the main wheels, as shown and described.

3. In combination with a vehicle, a rotary fulcrum and driver-wheel situated in the rear of the main wheels, provided with teeth on its periphery and connected with the operating mechanism of the vehicle, whereby it can be rotated in unison with the main wheels.

4. In combination with a vehicle, the rotary fulcrum and driver-wheel provided with pinion-gearing on its axle, the pinion-wheels journaled in the frame of the vehicle, the horizontally-moving racks gearing therewith, and the segments and operating-levers, all arranged substantially as and for the purposes set forth.

5. In combination with a vehicle, the segments journaled in sliding blocks in the main frame of the vehicle, connected to the treadle-levers and to the driving-wheels, and adapted to be operated by the former and to operate the latter, as set forth.

6. In combination with a vehicle, the segment-gearing journaled as described, and provided with springs for retracting them to their normal and operative position, the treadle-levers connected to the segments, the rack and pinion gearing, and the rotary fulcrum-driver, all adapted to operate substantially as shown and described.

7. In a vehicle, the segment-gearing and the treadle-levers, in combination with the horizontally-moving racks provided with the movable and solid teeth, the main drivers and the rotary fulcrum-driver, and the intermediate pinion-gearing, all adapted to operate substantially as described.

8. In a vehicle, the segment-gearing provided with the retracting-springs, the treadle-levers connected to and adapted to operate the segments, the depending rods swiveled to the main frame slightly in front of the axle of the rotary fulcrum-driver, in combination with said driver and the intermediate rack and pinion gearing.

9. In combination with the vehicle hereinbefore described, the guide-wheel T, springs s and s', and lever U.

HUGH BAINES.

Witnesses:
 HERBERT KNIGHT,
 CHAS. MATTHEWS.